(12) United States Patent
Liu et al.

(10) Patent No.: US 11,005,355 B2
(45) Date of Patent: May 11, 2021

(54) SWITCHING TIME OPTIMIZER FOR SOFT SWITCHING OF AN ISOLATED CONVERTER

(71) Applicant: Texas Instruments Incorporated, Dallas, TX (US)

(72) Inventors: Pei-Hsin Liu, Westford, MA (US); Richard Lee Valley, Nashua, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/662,681

(22) Filed: Oct. 24, 2019

(65) Prior Publication Data
US 2020/0059152 A1 Feb. 20, 2020

Related U.S. Application Data

(63) Continuation of application No. 15/944,565, filed on Apr. 3, 2018, now Pat. No. 10,491,097.
(Continued)

(51) Int. Cl.
*H02M 1/08* (2006.01)
*H02M 3/335* (2006.01)
(Continued)

(52) U.S. Cl.
CPC .............. *H02M 1/083* (2013.01); *H02M 1/38* (2013.01); *H02M 3/156* (2013.01);
(Continued)

(58) Field of Classification Search
CPC ........ H02M 1/083; H02M 1/38; H02M 3/156; H02M 3/1588; H02M 3/33569; H02M 2001/0025; H02M 2001/0058
See application file for complete search history.

(56) References Cited

U.S. PATENT DOCUMENTS 5,745,358 A * 4/1998 Faulk ................ H02M 3/33523
363/21.13
6,011,703 A * 1/2000 Boylan ............. H02M 3/33592
363/127

(Continued)

*Primary Examiner* — Fred E Finch, III
*Assistant Examiner* — Kevin H Sprenger
(74) *Attorney, Agent, or Firm* — Lawrence J. Bassuk; Charles A. Brill; Frank D. Cimino (57) ABSTRACT

An apparatus is disclosed for improving zero voltage switching ("ZVS") of a converter circuit such as an active clamp flyback converter. The apparatus includes a first timing circuit acting as the $T_{D(L-H)}$ optimizer, which uses the zero-crossing of the auxiliary winding voltage directly to adaptively vary the dead time. A second timing circuit acting as the $T_{D(H-L)}$ optimizer adaptively varies the dead time with a simple piece-wide linear function as an approximation of the complex optimal equation. A third timing circuit acting as the $T_{DM}$ optimizer contains a charge-pump circuit that adaptively adjusts the ON time of the clamp switch based on the zero-voltage detection of switching node voltage and feed-forwards the input voltage signal to enhance tuning speed so that the correct amount of negative magnetizing current is generated to improve zero voltage switching.

15 Claims, 4 Drawing Sheets

Related U.S. Application Data

(60) Provisional application No. 62/480,881, filed on Apr. 3, 2017.

(51) Int. Cl.
*H02M 3/156* (2006.01)
*H02M 1/38* (2007.01)
*H02M 3/158* (2006.01)
*H02M 1/00* (2006.01)

(52) U.S. Cl.
CPC ..... *H02M 3/1588* (2013.01); *H02M 3/33569* (2013.01); *H02M 2001/0025* (2013.01); *H02M 2001/0058* (2013.01)

(56) References Cited

U.S. PATENT DOCUMENTS

| | | | | |
|---|---|---|---|---|
| 8,767,418 | B2* | 7/2014 | Jungreis | H02M 1/08 |
| | | | | 323/238 |
| 9,991,800 | B2* | 6/2018 | Hari | H02M 3/33507 |
| 2010/0301827 | A1* | 12/2010 | Chen | H02M 3/156 |
| | | | | 323/299 |
| 2011/0257791 | A1 | 10/2011 | Hawker et al. | |
| 2011/0292688 | A1* | 12/2011 | Zhang | H02M 1/32 |
| | | | | 363/21.02 |
| 2011/0298514 | A1 | 12/2011 | Hopkins | |
| 2013/0039104 | A1* | 2/2013 | Sharma | H02M 1/10 |
| | | | | 363/123 |
| 2014/0049240 | A1 | 2/2014 | Chen et al. | |
| 2014/0307484 | A1* | 10/2014 | Yang | H02M 3/33569 |
| | | | | 363/21.12 |
| 2017/0005585 | A1* | 1/2017 | Shimura | G03G 15/80 |
| 2018/0048232 | A1* | 2/2018 | Adell | H03L 7/085 |

* cited by examiner

SWITCHING TIME OPTIMIZER FOR SOFT SWITCHING OF AN ISOLATED CONVERTER

CROSS REFERENCE TO RELATED APPLICATIONS

Under 35 U.S.C. §§ 119(e), 120, this continuation application claims benefits of priority to U.S. patent application Ser. No. 15/944,565, filed on Apr. 3, 2018, now U.S. Pat. No. 10,491,097, issued Nov. 26, 2019, which claims the benefit of priority to U.S. provisional patent application No. 62/480,881 filed Apr. 3, 2017. The entirety of the above referenced applications are hereby incorporated herein by reference.

TECHNICAL FIELD

This disclosure relates generally to switching optimization in power management devices and more specifically to zero voltage switching (ZVS) of an active clamp flyback converter.

BACKGROUND

Flyback converters convert a first alternating current (AC) level or a first direct current (DC) level to a second DC current level. Flyback converters often have two or more circuits that are galvanically isolated from one another. Galvanic isolation means that current cannot flow directly between the circuits. However, energy can still be transferred between the different portions of the circuit through other means such as, for example, capacitance, induction, or electromagnetism.

Flyback converters commonly use transformers to galvanically isolate different circuits within the flyback converter. Transformers transfer energy through a coupling created by the magnetic flux between a first and a second winding of the transformer. Depending on the winding ratio of the transformer, a first voltage may be increased, decreased, or in some applications remain the same.

The transformer effectively splits the flyback converter into two circuits, a primary circuit and a secondary circuit. When the primary side circuit is ON, current flows through the windings of the transformer in the primary circuit. The flow of current through the windings creates a magnetic flux that induces a voltage with a first polarity across the transformer windings of the secondary circuit. Energy is stored in the magnetic flux between the transformer windings of the primary circuit and the transformer windings of the secondary circuit. The secondary circuit will have a polar circuit mechanism, such as a diode, that will prevent energy from flowing as electric current through the secondary circuit transformer windings when the voltage across the polar mechanism is reversed biased. When the primary circuit is OFF the polarity of the voltage across the secondary winding is reversed and the energy stored in the magnetic flux between the primary circuit transformer windings and the secondary circuit transformer windings will flow into the secondary circuit as electric current. However, not all of the energy stored in the magnetic flux is transferred to the secondary circuit. Some energy is stored in the primary circuit by a magnetizing inductance of the primary circuit, and some energy is stored in the primary circuit as the result of a leakage inductance of the primary circuit. These inductances create electric currents in the primary circuit even when the primary circuit is OFF.

The ON and OFF states of the primary circuit can be controlled by a control switch disposed between an input of the primary circuit and its ground. The input of the converter is connected to a first terminal of the transformer, and the control switch is connected to the other terminal. By controlling the connection to ground using the switch, current flowing through the primary circuit transformer windings from the input is controlled. The switching voltage at the node that connects the transformer to the control switch will alternate between a high-voltage level and a value close to 0V, when the control switch changes the state.

When the connection of the clamping circuit between the switching node and ground or between the switching node and input source is controlled by a clamping switch in series with the clamping capacitor, the clamp circuit is considered active. The active clamp circuit can eliminate both switching loss and clamping loss of the flyback converter. The flow of current at various switching states is described in detail in R. Watson, F. C. Lee, G. C. Hua, "Utilization of an active-clamp circuit to achieve soft switching in flyback converter," IEEE Trans., 1994 which is hereby incorporated by reference in its entirety.

When the primary circuit is turned off, the energy stored in the primary circuit as a result of the magnetizing and leakage inductance will commute to a clamp circuit. The clamp circuit may connect between the node that connects the transformer to the control switch and ground, or between the switch node and the input source.

When the clamping circuit is formed by a diode rectifier in series with a transient voltage suppressor (TVS), two power losses impair the efficiency of the power convertor, especially when the control switch is operated at high switching frequency. These power losses are switching loss and clamping loss. Switching loss is governed by equation (1) below.

$$P_{Csw} = \tfrac{1}{2} C_{sw}(V_{in} - NV_0)^2 f_{sw}$$

Equation (1) explains that the power dissipated by the control switch, $P_{Csw}$, is equal to half of the square of the difference between the input voltage, $V_{in}$, and the product of the winding ratio, N, and the output voltage, $V_0$, multiplied by the resonate switch node capacitance, $C_{sw}$, and the switching frequency, $f_{sw}$. Clamping loss is governed by equation (2) below.

$$P_{clamp} = \frac{V_{clamp}}{V_{clamp} - NV_0} \frac{1}{2} L_k i_{m(+)}^2 f_{sw}$$

Equation (2) explains that the power dissipated by the clamp circuit, $P_{clamp}$, is equal to half of the ratio of the clamp voltage on the TVS, $V_{clamp}$, to the difference between the clamp voltage and the product of the winding ratio, N, and the output voltage, $V_0$, multiplied by the product of the leakage inductance, $L_k$, the switching frequency, $f_{sw}$, and the square of the positive peak magnetizing current, $i_{m(+)}$.

As can be seen from observing equations (1) and (2) above, the clamping loss, $P_{clamp}$, and the switching loss, $P_{Csw}$, are directly proportional to the switching frequency, $f_{sw}$. As such, clamping and switching losses are bottlenecks from high frequency operation of the flyback converters using this conventional clamping circuit.

The power losses explained in equations (1) and (2) above can be minimized by controlling the ON and OFF state of the control switch and the clamp switch in accordance with zero voltage switching (ZVS) conditions. ZVS can be achieved when the inequality in equation (3) below is true.

$$\tfrac{1}{2} L_m i_{m(-)}^2 \geq \tfrac{1}{2} C_{sw} V_{sw}^2$$

Equation (3) explains that zero voltage switching can be achieved when half of the product of the magnetizing inductance, $L_m$, and the square of the negative peak magnetizing current, $i_{m(-)}$, is greater than or equal to half of the product of the resonant switching node capacitance, $C_{sw}$, and the square of the switching node voltage, $V_{sw}$.

In order to control the ON and OFF states of the control and clamp switches such that ZVS conditions are met, the length of the dead time between turning the control switch OFF and the clamp switch ON, $T_{D(L-H)}$; the length of the time the clamp switch is ON, $T_{DM}$; and the length of dead time between turning the clamp switch OFF and the control switch ON, $T_{D(H-L)}$, must be properly controlled.

The goal of controlling $T_{D(L-H)}$ is to properly control the ZVS timing of the clamping switch. Optimally, $T_{D(L-H)}$ may be controlled by equation (4) below.

$$T_{D(L-H)} = \frac{C_{sw}}{i_{m(+)}}(V_{in} + NV_0)$$

Equation (4) explains that $T_{D(L-H)}$ is directly proportional to the switching node capacitance, $C_{sw}$, multiplied by the sum of the input voltage, $V_{in}$, and the product of the winding ratio, N, and the output voltage, $V_0$. Equation (4) further explains that $T_{D(L-H)}$ is inversely proportional to the positive peak current, $i_{m(+)}$.

The switching node capacitance, $C_{sw}$, represents the total capacitive load of the switching node on the primary circuit, which includes the nonlinear junction capacitance of control switch and clamping switch. Variation of the switching node capacitance, $C_{sw}$, is affected by the capacitance nonlinearity and the manufacturing tolerance. The input voltage, $V_{in}$, range varies widely due to the universal AC line's ranging from 90 Vac to 265 Vac. The voltage output, $V_0$, range also varies widely from 5V to 20V to power personal electronic devices, and $i_{m(+)}$ is modulated for the output voltage, $V_0$, regulation of the wide output load range. Because Equation (4) is sensitive to those parameter changes and operating conditions, controller design based on Equation (4) is difficult.

For example, $C_{sw}$ has non-linear components. Taking these non-linearities into account, the optimal $T_{D(L-H)}$ is approximated by Equation (5) below.

$$T_{D(L-H)} \approx \frac{2C_{oss\_Small}}{i_{m(+)}}(V_{in} + NV_0 - V_{th}) + \frac{2C_{oss\_Big}}{i_{m(+)}}V_{th}$$

Equation (5) accounts for the non-linear nature of $C_{sw}$, by approximating $T_{D(L-H)}$ using its components, $C_{oss\_Small}$ and $C_{oss\_Big}$. $V_{th}$ is the drain-to-source voltage of the control switch where the junction capacitance transitions from a large capacitance value to a small capacitance value.

If the clamping switch is turned ON before the optimal time period for $T_{D(L-H)}$ expires, ZVS is lost for the clamping switch. This will result in a hard-switching event. Hard-switching causes large power loss and creates a large amount of electromagnetic interference.

For any duration of time that the clamping switch remains OFF after the optimal time period for $T_{D(L-H)}$ expires, power losses across the body diode of the clamping switch will occur, since the body diode conduction time is extended.

The goal of controlling $T_{DM}$ is to properly control the ON time of the control switch. $T_{DM}$ can be optimally calculated using equation (6) below.

$$T_{DM} = \frac{L_m i_{m(+)}}{NV_0} + \tan(\theta_2)\sqrt{L_m C_{sw}}$$

where $$T_{LC} = 2\pi\sqrt{L_m C_{sw}} \text{ and } \theta_2 = \cos^{-1}\frac{NV_0}{V_{in}}$$

Equation (6) explains that the optimal value of $T_{DM}$ is equal to the ratio of the product of the magnetizing inductance, $L_m$, and the positive peak magnetizing current, $i_{m(+)}$, to the product of the winding ratio, N, and the output voltage, $V_0$, added to the product of tan ($\theta_2$) and the square root of the product of the magnetizing current, $L_m$, and the resonant switching node capacitance, $C_{sw}$.

If $T_{DM}$ is not long enough, the negative peak magnetizing current will not be large enough, causing the switching node voltage, $V_{sw}$, to be greater than zero when $T_{D(H-L)}$ expires. This will result in loss of ZVS of the control switch, causing switching losses to increase.

If $T_{DM}$ is too long, the negative peak magnetizing current will become too large. This results in a larger conduction loss because the root mean square (RMS) of the magnetizing current is larger, causing more current flow into the clamping and control switches as well as the transformer. This also results in a larger power loss on the magnetic core of the transformer because higher peak-to-peak magnetizing current increases the flux density.

The goal of controlling $T_{D(H-L)}$ is to properly control the ZVS timing of the control switch. $T_{D(H-L)}$ can be optimally controlled by equation (7) below.

$$T_{D(H-L)OPT} = \frac{(\pi - \theta_2)}{2\pi}T_{LC}$$

Where $$T_{LC} = 2\pi\sqrt{L_m C_{sw}} \text{ and } \theta_2 = \cos^{-1}\frac{NV_0}{V_{in}}$$

Equation (7) explains that the optimal value of $T_{D(H-L)}$ is equal to the product of the capacitive-inductive time constant, $T_{LC}$, and the quotient of $$\frac{(\pi - \theta_2)}{2\pi}.$$

If $T_{D(H-L)}$ is too long, the switching node voltage, $V_{sw}$, will resonate above 0V again after the voltage reaches 0V and cause the control switch to be turned ON when the switching node voltage, $V_{sw}$, is a non-zero value. This results in a loss of ZVS for the control switch and causes power losses.

If $T_{D(H-L)}$ is too short, the negative peak magnetizing current has to be increased to achieve ZVS of control switch within the limited time. This results in a large conduction loss because the root mean square (RMS) of the magnetizing current is larger, causing more current to flow into the clamping and control switches as well as the transformer.

Besides, this also results in a large power loss on the magnetic core of the transformer because higher peak-to-peak magnetizing current increases the flux density.

A first prior art solution addresses the power losses associated with $T_{D(L-H)}$, $T_{DM}$, and $T_{D(H-L)}$, discussed above, by fixing $T_{D(L-H)}$ and $T_{D(H-L)}$ to a set length of time and creating a duty cycle dependent $T_{DM}$ using a fixed switching frequency. In this solution, the two fixed dead time settings cannot provide optimal design over the parameter variations, so the related power loss issues cannot be resolved. The duty cycle of the pulse width modulated signal controlling $T_{DM}$ is operated at a constant frequency condition through the input and load range. However, because the frequency of the PWM signal is fixed, the power losses when utilizing this prior art solution are still substantial. For example, the fixed frequency operation keeps $T_{DM}$ the same between heavier and lighter output load conditions, so the fixed $T_{DM}$ will unnecessarily increase the negative peak magnetizing current, $i_{m(-)}$, at a lighter load. This will result in too much circulating energy in the circuit for ZVS, so light load efficiency is impaired. Similarly, if the frequency remains the same for high and low input voltage, $V_{in}$, conditions, the negative peak magnetizing current will be too low for low line, resulting in hard switching of the control switch.

A second prior art solution attempts to use complex mathematical equations that use predicted values of the magnetizing inductance, L, and the resonant switching node capacitance, $C_{sw}$, to individually solve for $T_{D(L-H)}$, $T_{DM}$, and $T_{D(H-L)}$. However, the use of these equations increases the cost of the microcontroller unit (MCU) needed to solve for these values. Most importantly, the values generated are sensitive to component tolerance because they are based on the magnetizing inductance, $L_m$, and the resonant switching node capacitance, $C_{sw}$. When the actual value is deviated away from the predetermined value in MCU, the calculated result will be offset from the optimal timing, and causes the power loss increase.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve understanding of various embodiments of the disclosure. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

The following detailed embodiments describe an apparatus for optimally performing zero voltage switching ("ZVS") of an active clamp flyback converter. A first timing circuit acts as a $T_{D(L-H)}$ optimizer and receives a signal detecting the zero-crossing of the auxiliary winding voltage directly in order to adaptively vary the dead time. A second timing circuit acts as a $T_{D(H-L)}$ optimizer to adaptively vary the dead time with a simple piece-wide linear function, which is an approximation of the complex optimal equation described above. A third timing circuit acts as a $T_{DM}$ optimizer and includes a charge-pump circuit that adaptively adjusts the ON time of the clamp switch based on the zero-voltage detection of the switching node voltage so that the correct amount of negative magnetizing current is generated to improve zero voltage switching. Together these three timing circuits work to reduce or avoid the need of computing complex calculations through a microcontroller unit (MCU) to solve the optimal control values and compensate the parameter variations based on direct voltage sensing and online adjustment for every switching cycle.

Figure 1:
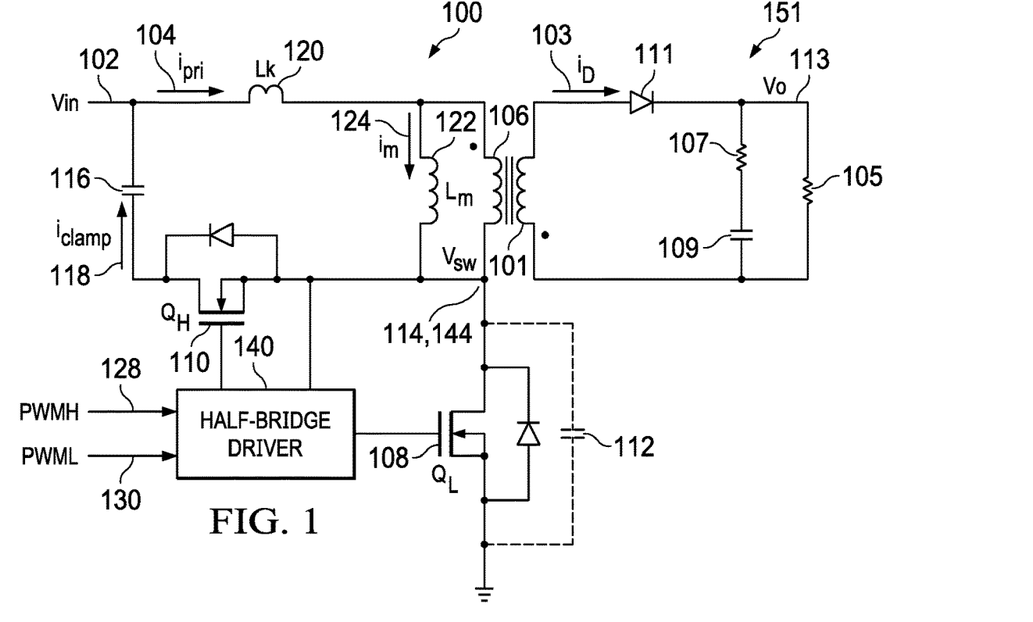
FIG. 1 illustrates an example active clamp flyback converter.

Referring now to the figures, FIG. 1 illustrates an example of an active clamp flyback converter circuit. The active clamp flyback converter circuit has a primary side 100 and a secondary side 151. The primary side 100 takes an input voltage $V_{in}$ 102 that induces current $I_{pri}$ 104 to flow through primary side windings 106 when the control switch $Q_L$ 108 is ON. The control switch $Q_L$ 108 may be any switch that can be controlled by a pulse width modulated signal. For example, the control switch $Q_L$ 108 may be a metal oxide semiconductor field effect transistor ("MOSFET") or a gallium nitride field effect transistor ("GaN FET"). The PWML signal 130 is a pulse width modulated signal that turns the control switch 108 ON and OFF through a half-bridge gate driver 140. The PWML signal 130 will turn control switch $Q_L$ 108 ON and OFF based on the logic state of the PWML signal 130. For example, if the PWML signal 130 is logic HIGH the control switch $Q_L$ 108 will be ON, and if the PWML signal 130 is logic LOW the control switch $Q_L$ 108 will be OFF. The half bridge gate driver 140 can convert the logic state of PWML to an appropriate driving voltage between the gate and the source of the control switch $Q_L$ 108. As will be described in detail in the description of FIG. 2, the timing of the state change of the PWML signal 130 depends on $T_{D(H-L)}$.

Because the clamp current $i_{clamp}$ 118 is bi-directional when the clamp switch $Q_H$ 110 is ON, the voltage of the clamp capacitor 116 is applied across the magnetizing inductance 122 to create a negative magnetizing current for ZVS. The clamp switch $Q_H$ 110 may be any switch that can be controlled by a pulse width modulated signal. For example, the clamp switch $Q_H$ 110 may be a MOSFET or a GaN FET. The PWMH signal 128 is a pulse width modulated signal that turns the clamp switch $Q_H$ 110 ON and OFF through a half-bridge gate driver 140. The PWMH signal 128 will turn clamp switch $Q_H$ 110 ON and OFF based on the logic state of the PWMH signal 128. For example, if the PWMH signal 128 is logic HIGH the clamp switch $Q_H$ 110 will be ON, and if the PWMH signal 128 is logic LOW the clamp switch $Q_H$ 110 will be OFF. It can also be the case that if the PWMH signal 128 is logic HIGH, the control switch $Q_H$ 110 will be OFF, and if the PWMH signal 128 is logic LOW, the control switch $Q_H$ 110 will be ON. The half-bridge gate driver 140 level shifts from the logic state of PWMH to an appropriate driving voltage between the gate and the source of the clamp switch $Q_H$ 110. As will be described in detail in the description of FIG. 2, the timing of the state change of the PWMH signal 128 depends on $T_{D(L-H)}$ and $T_{DM}$.

The primary side 100 of the active clamp flyback converter has a leakage inductance $L_k$ 120 and a magnetizing inductance $L_m$ 122. The leakage inductance $L_k$ 120 and the magnetizing inductance $L_m$ 122 are not physical circuit elements; rather they illustrate inductances introduced into the primary side 100 by the primary side windings 106 of the transformer. The magnetizing current $i_m$ 124 is the current introduced into the primary side 100 by the magnetizing inductance $L_m$ 122.

Similarly, the primary side 100 of the active clamp flyback converter has a resonant switching node capacitance $C_{sw}$, 112 at the switching node 144. The resonant switching node capacitance $C_{sw}$ 112 is not a physical circuit element itself. Instead, the resonant switching node capacitance $C_{sw}$ 112 is dominated by the sum of the parasitic junction capacitance of the clamp switch $Q_H$ 110 and the control switch $Q_L$ 108 of the primary side 100.

The secondary side 151 has a secondary side winding 101 and a polar element 111, such as a diode, that controls the flow of the current $i_D$ 103 through the secondary side 151 by acting as an output rectifier. The secondary side 151 also has an output filter capacitor 109 with its equivalent series resistance 107 acting to reduce the output switching ripple of the output voltage $V_O$ 113 across the resistive output load 105.

Figure 2:
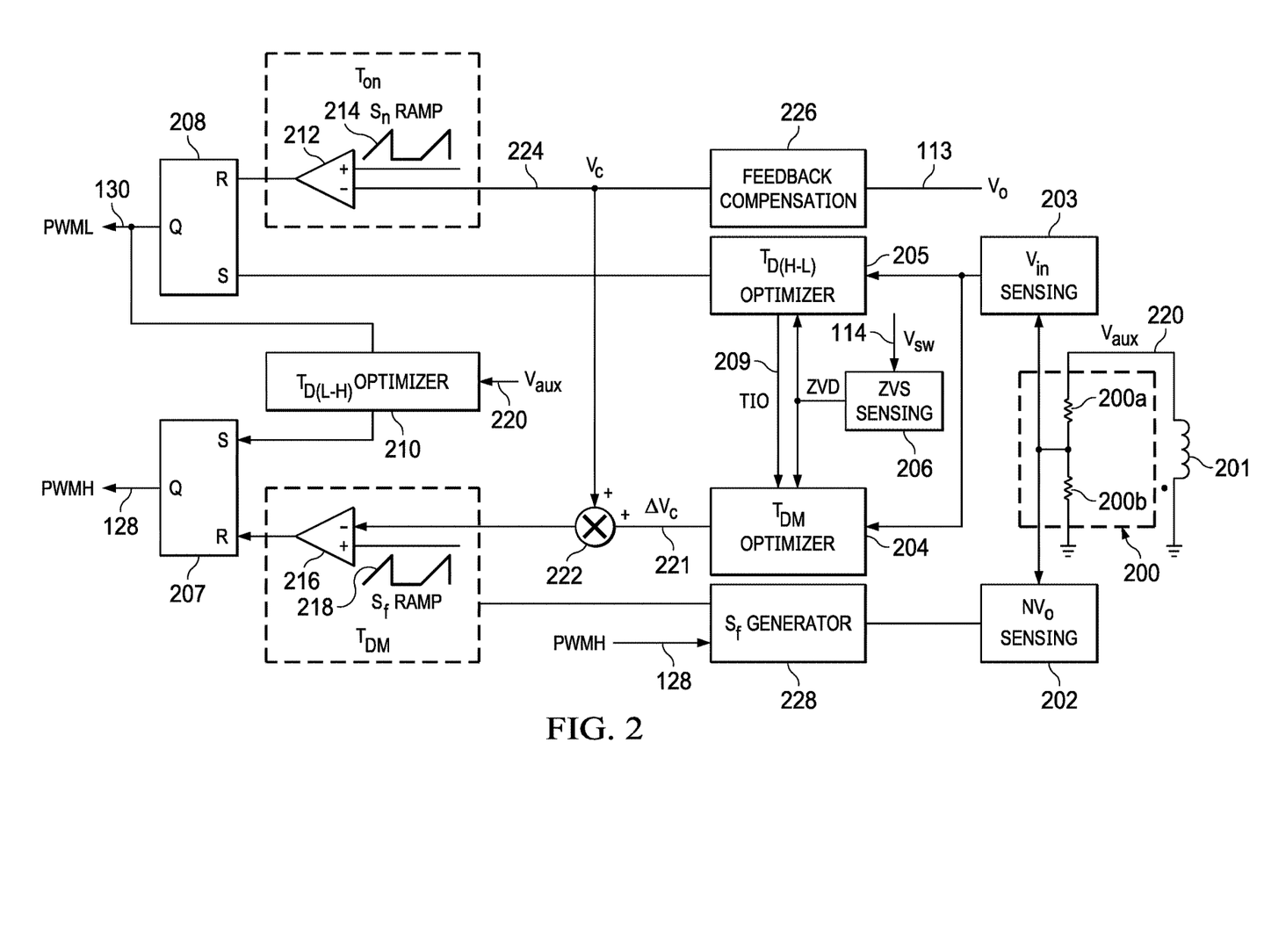
FIG. 2 illustrates a schematic block diagram of a control system for controlling ZVS of an active clamp flyback converter.

FIG. 2 illustrates a control circuit for driving the clamp switch and the control switch of an active clamp flyback converter, such as the active clamp flyback converter circuit illustrated in FIG. 1, according to optimized values for $T_{D(H-L)}$, $T_{D(L-H)}$, and $T_{DM}$ using a first timing circuit corresponding to a $T_{D(H-L)}$ optimizer 205, a second timing circuit corresponding to a $T_{D(L-H)}$ optimizer 210, and a third timing circuit corresponding to a $T_{DM}$ optimizer 204. The voltage divider 200 senses an auxiliary winding voltage $V_{aux}$ 220 across an auxiliary winding 201. The auxiliary winding is a separate winding coupled with the primary winding 106 and the secondary winding 101. The voltage divider 200 divides the auxiliary voltage across the resistors 200a and 200b. An input voltage, such as input voltage $V_{in}$ 102, is sensed by the $V_{in}$ sensing circuit 203 from a voltage determined by the voltage divider 200. Likewise, a clamped primary voltage, $NV_O$, of the primary side winding is sensed by the $NV_O$ sensing circuit 202.

The $V_{in}$ sensing circuit 203 may be coupled to both the first timing circuit such as the $T_{D(H-L)}$ optimizer 205 and the third timing circuit such as the $T_{DM}$ optimizer 204. The $T_{D(H-L)}$ optimizer 205 and the $T_{DM}$ optimizer are coupled to each other as well as to the ZVS sensing circuit 206. The ZVS sensing circuit 206 takes the switching node voltage V, 114 of the switching node 244 as an input and outputs a zero voltage detection (ZVD) to both the $T_{D(H-L)}$ optimizer 205 and the $T_{DM}$ optimizer 204. The $T_{D(H-L)}$ optimizer 205 takes an analog feedforward signal from $V_{in}$ sensing circuit 203 and the ZVD signal from the ZVS sensing circuit 206 as an input and outputs a time-out (TIO) logic signal 209 to the $T_{DM}$ optimizer 204 and outputs a logic signal to set an SR flip flop 208. The $T_{D(H-L)}$ optimizer 205 will be described below with reference to FIG. 4, and the $T_{DM}$ optimizer 204 will be described below with reference to FIG. 3.

The control system of FIG. 2 may further include a feedback compensation circuit 226, a comparator 212, and an SR flip-flop 208. The SR flip-flop 208 acts as a state register having a high state and a low state corresponding to a logic HIGH state and a logic LOW state. The feedback compensation circuit 226 is coupled to the comparator 212. The comparator 212 and the $T_{D(H-L)}$ optimizer 205 are coupled to the SR flip-flop 208. The comparator 212 takes, as input, the output of the feedback compensation circuit 226 and a $S_n$, ramp signal 214. The $S_n$, ramp signal 214 is a current-sense signal proportional to the switching current flowing through the control switch $Q_L$ 108. The $S_n$, ramp signal 214 may be determined by, for example, using a current-sense resistor or a current-sense transformer in series with the source pin of the control switch $Q_L$ 108. If a value of the feedback compensation voltage $V_c$ 224 is lower than the value of the $S_n$, ramp signal 214, the comparator 212 outputs logic HIGH. Otherwise, the comparator 212 outputs logic LOW. The output of the comparator 212 controls the reset function of the SR flip-flop 208. The output of the SR flip-flop 208 provides a pulse width modulated signal such as the PWML signal 130. When a logic HIGH value is received by the SR flip-flop 208 from the comparator 212, the PWML signal 130 will remain logic low until a logic HIGH value is received from the $T_{D(H-L)}$ optimizer 205. The logic state of the $T_{D(H-L)}$ optimizer 205 controls the set function of the SR flip-flop 208. When the $T_{D(H-L)}$ optimizer 205 outputs logic HIGH, the output of the PWML signal 130 will remain logic HIGH until the comparator 212 outputs logic HIGH.

The control system of FIG. 2 may further include a second timing circuit such as the $T_{D(L-H)}$ optimizer 210, a summing node 222, a comparator 216, and an SR flip-flop 207. The SR flip-flop 207 acts as a state register having a high state and a low state corresponding to a logic HIGH state and a logic LOW state. The $T_{D(L-H)}$ optimizer 210 will be described in detail below with reference to FIG. 5. The feedback compensation circuit 226 and the $T_{DM}$ optimizer 204 are coupled to the summing node 222. The summing node 222 is coupled to the comparator 216. The comparator 216 and the $T_{D(L-H)}$ optimizer 216 are coupled to the SR flip-flop 207. The summing node 222 sums the output compensation voltage $V_c$ 224 with the voltage output 221 from the $T_{DM}$ optimizer 204. The comparator 216 receives as input the summed voltage from the summing node 222 and an $S_f$ ramp signal 218. The $S_f$ ramp signal is generated from the output from the $NV_O$ sensing circuit 202 and the PWMH signal 128 by a $S_f$ ramp generating circuit 228 and output to the comparator 216. The slope of the $S_f$ ramp signal 218 will follow the change of output voltage 113 when the PWMH signal 128 is HIGH. When the value of the $S_f$ ramp signal 218 is greater than the summed voltage output from the summing node 222 the comparator 216 outputs logic HIGH. Otherwise, the comparator 216 outputs logic LOW. The output of the SR flip-flop 208 provides a pulse width modulated signal such as the PWMH signal 128. The output of the comparator 216 controls the reset function of the SR flip flop 207. When the comparator 216 outputs logic HIGH, the PWMH signal 128 remains logic LOW until the SR flip flop 207 is set. The $T_{D(L-H)}$ optimizer 210 controls the set function of the SR flip-flop 207. The $T_{D(L-H)}$ optimizer 210 is coupled to the SR flip-flop 208 and takes as input a pulse width modulated signal, such as the PWML signal 130, and the auxiliary voltage $V_{aux}$ 220. When the $T_{D(L-H)}$ optimizer 210 outputs logic HIGH, the PWMH signal 128 remains logic HIGH until the comparator 216 outputs logic HIGH. FIG. 6 illustrates the relationship between $T_{D(H-L)}$, $T_{DM}$, $T_{D(H-L)}$, the switching node voltage 114, PWMH signal 128, and the PWML signal 130.

Figure 3:
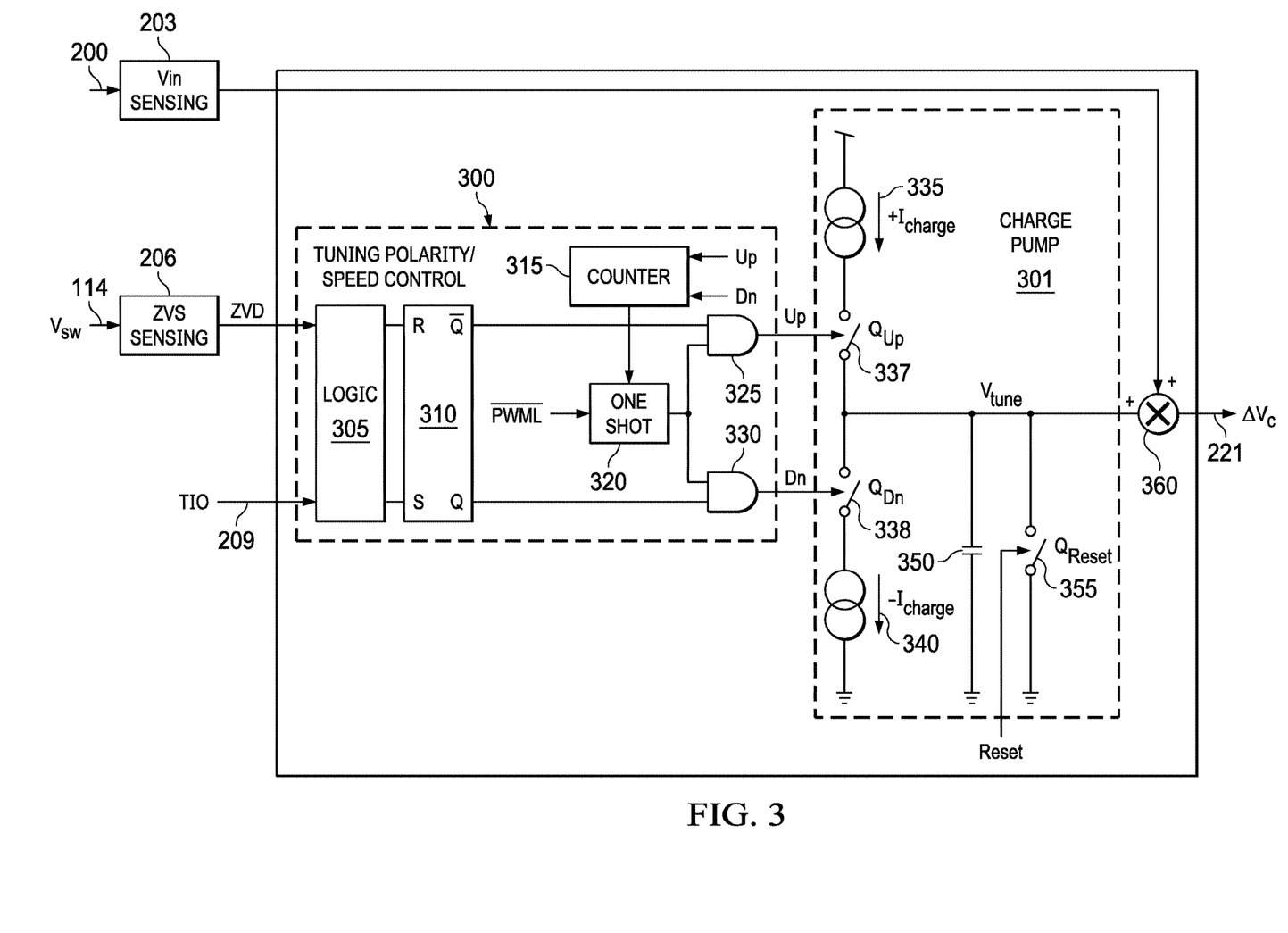
FIG. 3 illustrates a schematic block diagram of the analog tuner of the $T_{DM}$ optimizer of FIG. 2.

FIG. 3 illustrates a schematic block diagram of the $T_{DM}$ optimizer 204. The $T_{DM}$ optimizer 204 has at least a tuning polarity and speed control circuit 300 and a charge pump circuit 301. The tuning polarity and speed control circuit 300 is coupled to the ZVS sensing circuit 206 and the $T_{D(H-L)}$ optimizer circuit 205 via a logic circuit 305. Within the tuning polarity and speed control circuit 300, the logic circuit 305 is also coupled to an SR flip-flop 310, which is coupled to AND gates 325 and 330. The AND gates 325 and 330 are further coupled to the one-shot circuit 320, and the one-shot circuit 320 is coupled to a counter circuit 315. When the $T_{D(H-L)}$ optimizer circuit 205 outputs a timeout ("TIO") logic signal 209 as a logic HIGH value before the ZVS sensing circuit 206 outputs a ZVD as a logic HIGH value, PWML signal 130 will become logic HIGH. At the same time, the logic circuit 305 will control the SR flip-flop 310 to output logic HIGH to the AND gate 325. Then, at the falling edge of the PWML signal 130, the one-shot circuit 320 will generate a short logic HIGH pulse that will cause the AND gate 325 to close a charging switch $Q_{up}$, 337 for a short time by outputting a short logic HIGH pulse. When the charging switch $Q_{up}$, 337 is closed, a charge current source 335 of the charge pump circuit 301 flows to the tuning capacitor 350 increasing the voltage across the tuning capacitor and the $\Delta V_c$ value 221.

When the $T_{D(H-L)}$ optimizer circuit 205 outputs the TIO logic signal 209 as a logic LOW value before the ZVS sensing circuit 206 outputs a ZVD as a logic HIGH value, PWML signal 130 will become logic HIGH. At the same time, the logic circuit 305 will control the SR flip-flop 310 to output logic HIGH to AND gate 330. Then, at the falling edge of the PWML signal 130, the one-shot circuit 320 will generate a short logic HIGH pulse that will cause the AND gate 330 to close a charging switch $Q_{Dn}$ 338 for a short time by outputting a short logic HIGH pulse. When the charging switch $Q_{Dn}$ 338 is closed, a discharge current source 340 of the charge pump circuit 301 flows to ground from the tuning capacitor 350, decreasing the voltage across the tuning capacitor 350 and $\Delta V_c$ value 221.

The charge pump circuit 301 has a tuning capacitor 350 coupled to two switches, $Q_{up}$, 337 and $Q_{Dn}$, 338. When $Q_{up}$ 337 is closed, a charge current source 335 flows onto the tuning capacitor 350 and increases the $\Delta V_c$ voltage 221 across it. When $Q_{Dn}$ 338 is closed, a discharge current source 340 flows off of the tuning capacitor 350 and decreases the $\Delta V_c$ voltage 221 across it. For example, the voltage across the tuning capacitor 350 of the charge pump circuit 301 is determined in every switching cycle based on a racing condition between the occurrence of the zero-voltage detection (ZVD) condition of the switching node voltage 114 as determined by the ZVS sensing circuit 206 and a logic HIGH event of the time-out (TIO) condition as determined by $T_{D(H-L)}$ optimizer 205. If switching node voltage 114 reaches to 0V (ZVD output in a logic HIGH state) and the TIO logic signal 209 output from the $T_{D(H-L)}$ optimizer 205 is in a logic LOW state, $\Delta V_c$ value 221 output from the charge pump circuit 301 is decreased in the next switching cycle, in order to shorten $T_{DM}$. On the other hand, if switch node voltage 114 did not reach 0V (ZVD output in a logic LOW state) before the TIO logic signal 209 transitioned into a logic HIGH state, the $\Delta V_c$ value 221 output increases in the next switching cycle, in order to extend $T_{DM}$.

The $V_{in}$ sense circuit 203 provides an input feedforward signal to the $\Delta V_c$ voltage 221 through the summing node 360, so $\Delta V_c$ can quickly respond to changes in the input voltage $V_{in}$ 102 without waiting from the change pump circuit 301 to respond. The feedforward path makes the control switch 108 settle into ZVS condition more quickly, and saves the tuning range of the charge pump circuit 301 for compensating other parameter variations.

The counting circuit 315 records the number of consecutive times the voltage of the tuning capacitor 350 has been increased or decreased. If the voltage of the tuning capacitor 350 has been changed consecutively a number of times in either direction, the counter circuit 315 will increase the pulse width of the one-shot circuit 310. When PWMH signal 130 is disabled or controller restarts, a reset switch 355 is closed resetting the voltage of the tuning capacitor 350 to 0 v. This implementation of the $T_{DM}$ optimizer 204 benefits from having only a single charge pump which allows for both scalability and fast tuning because the pulse width of the one-shot circuit 320 is easily programmed and tuned.

Figure 4:
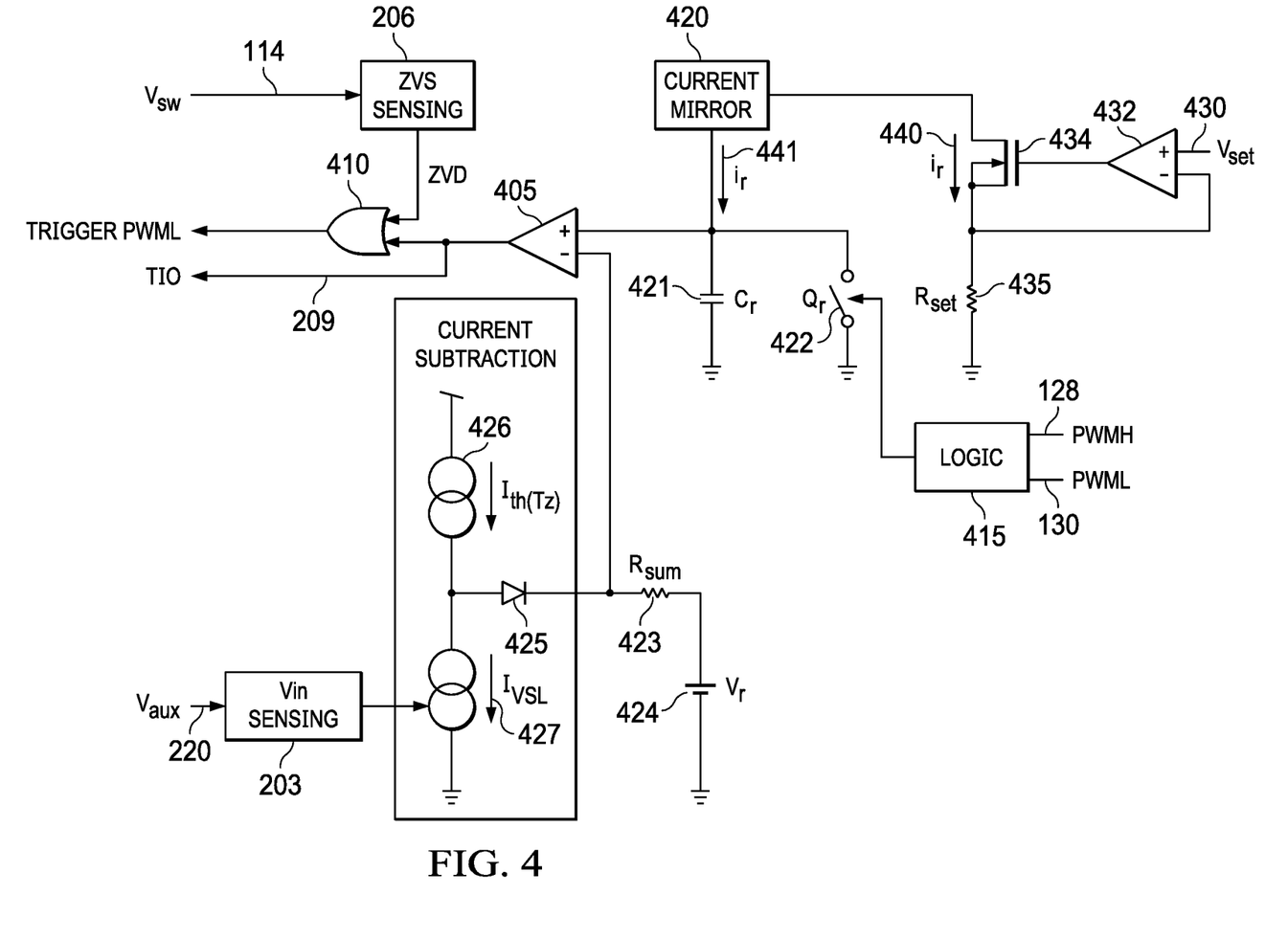
FIG. 4 illustrates a schematic block diagram of the $T_{D(H-L)}$ optimizer of FIG. 2.

FIG. 4 illustrates a schematic block diagram of the $T_{D(H-L)}$ optimizer 205 of FIG. 2. The $T_{D(H-L)}$ optimizer 205 acts as a control circuit that implements a piece-wise linear function and includes a comparator 405 coupled to an OR gate 410 for setting the PWMH signal 130 logic HIGH. The OR gate 410 is also coupled to the ZVS sensing circuit 206. The output of the comparator 405, TIO logic signal 209, is also coupled to the $T_{DM}$ optimizer 204 for determining the adjustment of $\Delta V_c$ 221. The OR gate 410 will drive the PWML signal 130 to a logic HIGH state by outputting a logic HIGH signal to set the SR flip-flop 208. The output of the OR gate 410 will become logic HIGH when either the ZVS sensing circuit 206 determines that the switching node voltage $V_{sw}$ 114 has reached 0V or the output of the comparator 405 is logic HIGH.

The comparator 405 determines if a value of a voltage value stored across a capacitor 421 is greater than a voltage value determined by a current subtraction circuit. The voltage stored across the capacitor $C_r$ 421 is determined by a current $i_r$ 441 output from current mirror 420. The current mirror 420 mirrors the current $i_r$ 440 flowing through the transistor 434. The current $i_r$ 440 is determined by the voltage $V_{SET}$ 430 and resistance $R_{SET}$ 435. The amplifier 432, as illustrated in FIG. 4, is configured to reflect the voltage $V_{SET}$ 430 across the resistance $R_{SET}$ 435. The resistance $R_{SET}$ 435 may be a static resistance provided by, for example, a resistor or a variable resistance provided by, for example, a digital potentiometer.

Charging the capacitor $C_r$ 421 is controlled by a charging switch $Q_r$ 422. The charging switch $Q_r$ will open, allowing the capacitor $C_r$ 421 to charge when the logic circuit 415 detects that the PWMH signal transitions from a logic HIGH state to a logic LOW state. The capacitor $C_r$ 421 will continue to charge until the voltage across the capacitor $C_r$ 421 is greater than the voltage determined by the current subtraction circuit.

The current subtraction circuit includes a summing resistor $R_{SUM}$ 423 coupled to a voltage supply $V_r$ 424 and a diode 425. The diode outputs the difference between a pre-set current $I_{th(Tz)}$ 426 and a current $I_{VSL}$ 427 to the summing resistor $R_{SUM}$ 423. The current $I_{VSL}$ 427 is controlled by the output of $V_{in}$ sensing circuit 203. When $V_{in}$ sensing circuit 203 senses the $V_{in}$ 102 changes through the negative winding voltage $V_{AUX}$ 220, the current $I_{VSL}$ 427 follows, so it provides a $V_{in}$ feedforward signal to vary the dead time width of $T_{D(H-L)}$ width in wide input voltage range. As such, $T_{D(H-L)}$ the amount of time the capacitor $C_r$ 421 is allowed to charge—is determined by the piece-wise linear function of equation (8) below.

$$\text{If } I_{VSL} > I_{th(T2)}, T_{D(H-L)} = T_{SET}$$
$$\text{If } I_{VSL} < I_{th(T2)}, T_{D(H-L)} = \frac{V_r + R_{sum}(I_{th(T2)} - I_{VSL})}{V_{SET}/R_{SET}} C_r$$

where, $T_{SET}$ programed by $$R_{SET} = \frac{V_{SET} T_{SET}}{C_r V_r}$$

This piece-wise linear implementation approximates the optimal value of $T_{D(H-L)}$ over a useful input voltage range and avoids increased MCU cost by eliminating complex mathematical computation.

When the OR gate 410 outputs logic HIGH, causing the PWML signal 130 to be driven logic HIGH, the logic circuit 415 closes the charging switch $Q_r$ 422 discharging the capacitor $C_r$ 421 to ground.

Figure 5:
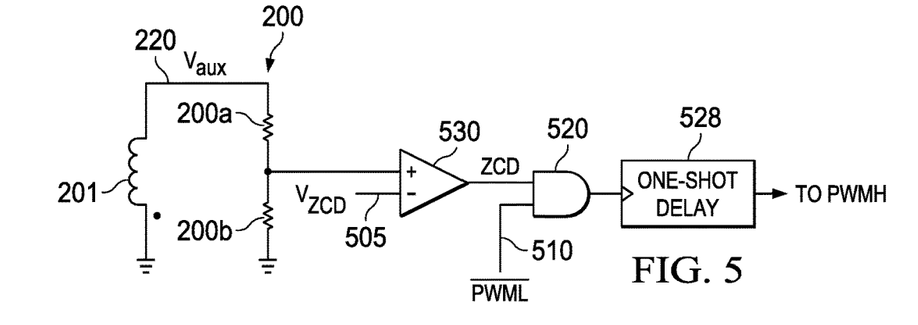
FIG. 5 illustrates a schematic block diagram of the $T_{D(L-H)}$ optimizer of FIG. 2.
Figure 6:
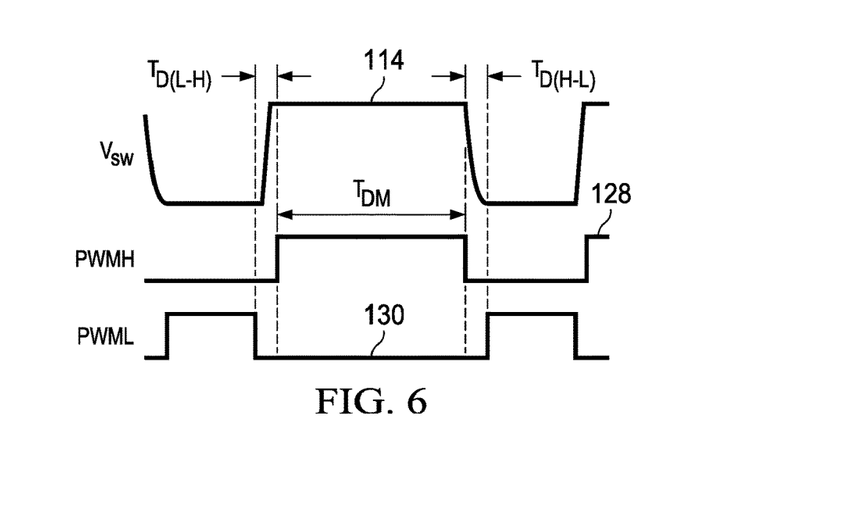
FIG. 6 illustrates a timing relationship between illustrates $T_{D(H-L)}$, $T_{DM}$, $T_{D(H-L)}$, the switching node voltage 114, PWMH signal 128, and the PWML signal 130.

FIG. 5 illustrates a schematic block diagram of the $T_{D(L-H)}$ optimizer of FIG. 2. The $T_{D(L-H)}$ optimizer circuit includes an AND gate 520 coupled to a comparator 530 and a one-shot delay circuit 528. The zero-crossing detection (ZCD) comparator 530 outputs logic HIGH when the auxiliary winding voltage $V_{aux}$ 220 is greater than a zero-crossing detection voltage $V_{ZCD}$ 505. When the output comparator 530 and the complement of the PWML signal 510 are both logic high, the AND gate 520 outputs a logic HIGH signal to set the SR flip-flop 207. The output to the SR flip-flop 207 is delayed for a variable dead time by the zero-crossing detection comparator 530 and the additional one-shot delay circuit 528. The zero-crossing of the aux winding voltage is used to provide a real-time indication that the switching node voltage 114 has been overcome in the slow ramping region caused by the high capacitance of the control switch 108 and increased to a high voltage level, so the complex calculation in Equation (4) or (5) can be avoided.

Those skilled in the art will recognize that a wide variety of modifications, alterations, and combinations can be made with respect to the above described embodiments without departing from the scope of the disclosure. For example, although the above description is made in the context of a flyback converter circuit, the same teachings are applicable to other converter circuits. Such modifications, alterations, and combinations are to be viewed as being within the ambit of the present disclosure.

What is claimed is:

1. An apparatus comprising:
    an output terminal configured to output a pulse width modulation (PWM) signal for driving a switch in a power converter, the PWM signal including a pulse having a rising edge dead time, a pulse width, and a falling edge dead time;
    a first timing circuit configured to adjust the pulse width based on a relative timing between a zero-voltage detection of a switch node in the power converter and a time-out event;
    a second timing circuit configured to detect the time-out event associated with a resonate time of the switch node, and configured to adjust the falling edge dead time based on at least one of the time-out event or the zero-voltage detection;
    a third timing circuit configured to adjust the rising edge dead time based on a zero-crossing detection of a voltage across an auxiliary winding of the power converter; and
    in which the second timing circuit includes:
    a programmable circuit configured to generate a first voltage across a capacitor based on a variable resistor;
    a current subtraction circuit configured to generate a second voltage based on a sense input voltage; and
    a comparator having a non-inverting input coupled to receive the first voltage, an inverting input coupled to receive the second voltage, and an output configured to deliver a logic signal representative of the time-out event.

2. The apparatus of claim 1, in which the resonate time of the switch node is based on a capacitance of the switch node and a magnetizing inductance coupled to the switch node.

3. The apparatus of claim 1, in which the switch includes a high side clamp switch and the power converter includes a flyback converter.

4. The apparatus of claim 1, in which the first timing circuit is configured to decrease the pulse width when the zero-voltage detection of the switch node is received before the time-out event.

5. The apparatus of claim 1, in which the first timing circuit is configured to increase the pulse width when the zero-voltage detection of the switch node is received after the time-out event.

6. The apparatus of claim 1, in which the first timing circuit includes:
    a charge pump circuit configured to adjust a tuning voltage based on the relative timing between the zero-voltage detection of the switch node in the power converter and the time-out event;
    an input voltage sensing circuit configured to generate a sense voltage representative of an input voltage of the power converter; and
    a summing node configured to generate a compensation voltage for adjusting the pulse width of the pulse in the PWM signal, the compensation voltage including a summation of the tuning voltage and the sense voltage.

7. The apparatus of claim 6, in which the charge pump circuit is configured to decrease the tuning voltage when the zero-voltage detection of the switch node is received before the time-out event.

8. The apparatus of claim 6, in which the charge pump circuit is configured to increase the tuning voltage when the zero-voltage detection of the switch node is received after the time-out event.

9. The apparatus of claim 6, in which the charge pump circuit includes:
    a capacitor having a first terminal configured to hold the tuning voltage, and a second terminal coupled to a ground terminal;
    a charge current source selectively coupled to the first terminal of the capacitor when the zero-voltage detection of the switch node is received after the time-out event; and
    a discharge current source selectively coupled to the first terminal of the capacitor when the zero-voltage detection of the switch node is received before the time-out event.

10. The apparatus of claim 6, in which the charge pump circuit includes:

a capacitor having a first terminal configured to hold the tuning voltage, and a second terminal coupled to a ground terminal;

a charge current source selectively decoupled from the first terminal of the capacitor when the zero-voltage detection of the switch node is received before the time-out event; and a discharge current source selectively decoupled from the first terminal of the capacitor when the zero-voltage detection of the switch node is received after the time-out event.

11. Active clamp flyback converter circuitry comprising:

(a) a low-high timing circuit including:
- a first comparator having an input coupled to an auxiliary winding, having a zero crossing detection input, and having a first comparator output;
- a one-shot delay circuit having an input coupled to the first comparator output and having a pulse width modulation high output;

(b) a clamp on timing circuit including:
- a tuning polarity and speed control circuit having an up output and having a down output; and
- a charge pump circuit having a serial connection of a first current source, an up switch coupled to the up output, a Vtune output, a down switch coupled to the down output, and a second current source;

(c) a high-low timing circuit including:
- a programmable circuit configured to generate a first voltage across a capacitor based on a resistor;
- a current subtraction circuit configured to generate a second voltage based on a sense input voltage; and
- a second comparator having a non-inverting input coupled to receive the first voltage, an inverting input coupled to receive the second voltage, and a second comparator output;

(d) a first state register having an input coupled to the second comparator output and having a low driver output; and (e) a second state register having an input coupled to the Vtune output, having an input coupled to the pulse width modulation high output, and having a high driver output.

12. The active clamp flyback converter circuitry of claim 11 including a primary circuit including:
- a control switch having a switch control input coupled to the low driver output;
- a clamp switch having a clamp control input coupled to the high driver output; and
- primary and the auxiliary windings of a transformer, the primary windings being coupled to the control switch and the clamp switch and the auxiliary winding being coupled to the primary winding.

13. The active clamp flyback converter circuitry of claim 12 including a driver circuit having a switch control output coupled to the switch control input, having a clamp control output coupled to the clamp control input, having an input coupled to the low driver output, and having an input coupled to the high driver output.

14. The active clamp flyback converter circuitry of claim 13 including a secondary circuit including a secondary winding coupled to the primary winding and coupled to a load.

15. The active clamp flyback converter circuitry of claim including
- a voltage input and a circuit ground;
- the primary winding has a first end coupled to the voltage input and has a second end coupled to a switching voltage node;
- the clamp switch is a first transistor having a first current terminal coupled to the switching voltage node and having a second current terminal;
- a capacitor having one terminal coupled to the voltage input and having another terminal coupled to the first transistor second current terminal; and
- the control switch is a second transistor having a first current terminal coupled to the switching voltage node and a second current terminal coupled to the circuit ground.

* * * * *